(12) United States Patent
Fujishiro et al.

(10) Patent No.: US 10,045,395 B2
(45) Date of Patent: Aug. 7, 2018

(54) BASE STATION, PROCESSOR, AND USER TERMINAL FOR SETTING A CONFIGURATION TO THE USER TERMINAL FOR DISCONTINUOUSLY MONITORING A PHYSICAL DOWNLINK CONTROL CHANNEL (PDCCH) ON WHICH A CONTROL SIGNAL IS TRANSMITTED BY THE BASE STATION

(71) Applicant: KYOCERA CORPORATION, Kyoto (JP)

(72) Inventors: Masato Fujishiro, Yokohama (JP); Hiroyuki Adachi, Kawasaki (JP); Kugo Morita, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/663,347

(22) Filed: Jul. 28, 2017

(65) Prior Publication Data
US 2017/0339723 A1 Nov. 23, 2017

Related U.S. Application Data

(63) Continuation of application No. PCT/JP2016/052251, filed on Jan. 27, 2016.

(51) Int. Cl.
*H04W 76/40* (2018.01)
*H04W 76/00* (2018.01)
(Continued)

(52) U.S. Cl.
CPC ......... *H04W 76/40* (2018.02); *H04W 76/002* (2013.01); *H04W 76/021* (2013.01);
(Continued)

(58) Field of Classification Search
CPC ............. H04W 72/005; H04W 72/042; H04W 72/1289; H04W 76/002; H04W 76/048; H04W 88/02; H04W 88/08; H04W 88/12
See application file for complete search history.

(56) References Cited

U.S. PATENT DOCUMENTS

2009/0149164 A1* 6/2009 Cai ..................... H04W 72/005
455/414.2

FOREIGN PATENT DOCUMENTS

EP 2273806 A1 1/2011
WO 2005/067180 A1 7/2005
(Continued)

OTHER PUBLICATIONS

International Search Report issued in PCT/JP2016/052251; dated Apr. 5, 2016.
(Continued)

*Primary Examiner* — Pao Sinkantarakorn
(74) *Attorney, Agent, or Firm* — Studebaker & Brackett PC

(57) ABSTRACT

A base station supports SC-PTM. The base station sets a first configuration and a second configuration to the user terminal. The first configuration is a configuration on the user terminal discontinuously monitoring a PDCCH on which a control signal is transmitted, the control signal being for receiving multicast data transmitted by the SC-PTM from the base station. The first configuration includes an On-duration timer that is a period during which the user terminal receives the PDCCH. The first configuration is a configuration corresponding to a RNTI assigned commonly to a plurality of user terminals that receives identical multicast data by the SC-PTM. The second configuration is a configuration on the user terminal discontinuously monitoring a PDCCH on which a control signal is transmitted, the control signal being for receiving data transmitted by another transmission method from the base station.

3 Claims, 12 Drawing Sheets

Related U.S. Application Data

(60) Provisional application No. 62/109,984, filed on Jan. 30, 2015.

(51) Int. Cl.
| | | |
|---|---|---|
| *H04W 76/04* | (2009.01) | |
| *H04W 76/02* | (2009.01) | |
| *H04W 76/28* | (2018.01) | |
| *H04W 76/11* | (2018.01) | |
| *H04W 88/08* | (2009.01) | |
| *H04W 88/12* | (2009.01) | |
| *H04W 88/02* | (2009.01) | |

(52) U.S. Cl.
CPC .......... *H04W 76/048* (2013.01); *H04W 76/11* (2018.02); *H04W 76/28* (2018.02); *H04W 88/02* (2013.01); *H04W 88/08* (2013.01); *H04W 88/12* (2013.01)

(56) References Cited

FOREIGN PATENT DOCUMENTS

| WO | 2007/145035 A1 | 12/2007 |
|---|---|---|
| WO | 2009/131087 A1 | 10/2009 |

OTHER PUBLICATIONS

Written Opinion issued in PCT/JP2016/052251; dated Apr. 5, 2016.
Huawei et al.; "New Study Item Proposal for Support of single-cell point-to-multipoint transmission in LTE"; 3GPP TSG RAN Meeting #66; RP-142205; Dec. 8-11, 2014; pp. 1-6; Maui, Hawaii, USA.
3rd Generation Partnership Project; Technical Specification Group Radio Access Network; Evolved Universal Terrestrial Radio Access (E-UTRA); Medium Access Control (MAC) protocol specification (Release 12); 3GPP TS 36.321 V12.4.0; Dec. 2014; pp. 32-33; 3GPP Organizational Partners.
Research in Motion; SC-PTM Multiplexing and Scheduling; 3GPP TSG-RAN WG2 # 61; R2-080807; Feb. 11-15, 2008; pp. 1-3; Sorrento, Italy.

* cited by examiner

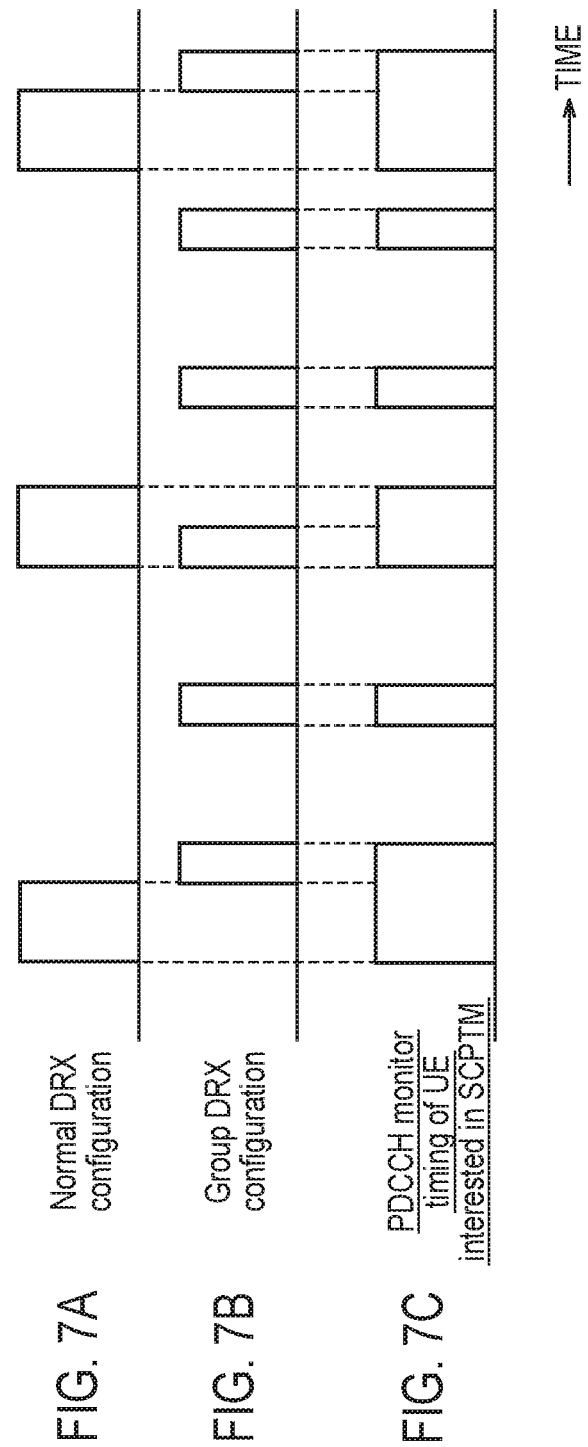

FIG. 8

```
GroupDRX-ConfigList ::=            SEQUENCE (SIZE (1..n)) OF GroupDRX-Config)

GroupDRX-Config ::=                SEQUENCE {
    Group-ID                           CHOICE {
        TMGI                               (TMGI value),
        GroupRNTI                          (Group RNTI value)
    }
    DRX-Config                         DRX-Config DRX-Config ::=                     CHOICE {
    release                            NULL,
    setup                              SEQUENCE {
        onDurationTimer                    ENUMERATED {
                                               psf1, psf2, psf3, psf4, psf5, psf6,
                                               psf8, psf10, psf20, psf30, psf40,
                                               psf50, psf60, psf80, psf100,
                                               psf200},
        drx-InactivityTimer                ENUMERATED {
                                               psf1, psf2, psf3, psf4, psf5, psf6,
                                               psf8, psf10, psf20, psf30, psf40,
                                               psf50, psf60, psf80, psf100,
                                               psf200, psf300, psf500, psf750,
                                               psf1280, psf1920, psf2560, psf0-v1020,
                                               spare9, spare8, spare7, spare6,
                                               spare5, spare4, spare3, spare2,
                                               spare1},
        drx-RetransmissionTimer            ENUMERATED {
                                               psf1, psf2, psf4, psf6, psf8, psf16,
                                               psf24, psf33},
        longDRX-CycleStartOffset           CHOICE {
            sf10                               INTEGER(0..9),
            sf20                               INTEGER(0..19),
            sf32                               INTEGER(0..31),
            sf40                               INTEGER(0..39),
            sf64                               INTEGER(0..63),
            sf80                               INTEGER(0..79),
            sf128                              INTEGER(0..127),
            sf160                              INTEGER(0..159),
            sf256                              INTEGER(0..255),
            sf320                              INTEGER(0..319),
            sf512                              INTEGER(0..511),
            sf640                              INTEGER(0..639),
            sf1024                             INTEGER(0..1023),
            sf1280                             INTEGER(0..1279),
            sf2048                             INTEGER(0..2047),
            sf2560                             INTEGER(0..2559)
        },
        shortDRX                           SEQUENCE {
            shortDRX-Cycle                     ENUMERATED {
                                                   sf2, sf5, sf8, sf10, sf16, sf20,
                                                   sf32, sf40, sf64, sf80, sf128, sf160,
                                                   sf256, sf320, sf512, sf640},
            drxShortCycleTimer                 INTEGER (1..16)
        }      OPTIONAL                                                  -- Need OR
    }
}

DRX-Config-v1130 ::=               SEQUENCE {
    drx-RetransmissionTimer-v1130      ENUMERATED {psf0-v1130} OPTIONAL,   --Need OR
    longDRX-CycleStartOffset-v1130     CHOICE {
        sf60-v1130                         INTEGER(0..59),
        sf70-v1130                         INTEGER(0..69)
    }                                                          OPTIONAL,   --Need OR
    shortDRX-Cycle-v1130               ENUMERATED {sf4-v1130} OPTIONAL     --Need OR
}
```

FIG. 9

```
-- ASN1START

SCPTM-SubframeConfigList ::=    SEQUENCE (SIZE (1..maxSCPTM-TMGI)) OF SCPTM-SubframeConfig SCPTM-SubframeConfig ::=        SEQUENCE {
    TMGI                            {TMGI value}
    radioframeAllocationPeriod      ENUMERATED {n1, n2, n4, n8, n16, n32},
    radioframeAllocationOffset      INTEGER (0..7),
    subframeAllocation              CHOICE {
        oneFrame                        BIT STRING (SIZE(10)),
        fourFrames                      BIT STRING (SIZE(40))
    }
}
-- ASN1STOP
```

FIG. 10A

```
GroupComm-Config ::=                    SEQUENCE {
    GroupPagingCycle                    ENUMERATED {
                                            rf1, rf2, rf4, rf8, rf16, default},
    GroupOccasion                       Bit String (10)
}
```

FIG. 10B

Group Occasion Example

| 0 | 1 | 1 | 1 | 0 | 0 | 1 | 1 | 0 | 1 |
|---|---|---|---|---|---|---|---|---|---|

$Ns_{Group}=6$

FIG. 10C $i\_s_{Group}$:

| PO when $i\_s_{Group}=0$ | PO when $i\_s_{Group}=0$ | PO when $i\_s_{Group}=0$ | PO when $i\_s_{Group}=0$ | PO when $i\_s_{Group}=0$ | PO when $i\_s_{Group}=0$ |
|---|---|---|---|---|---|
| 1 | 2 | 3 | 6 | 7 | 9 |

FIG. 12

```
                              Paging message
-- ASN1START

Paging ::=                    SEQUENCE {
    pagingRecordList              PagingRecordList              OPTIONAL,   -- Need ON
    systemInfoModification        ENUMERATED {true}             OPTIONAL,   -- Need ON
    etws-Indication               ENUMERATED {true}             OPTIONAL,   -- Need ON
    nonCriticalExtension          Paging-v890-IEs               OPTIONAL
}

Paging-v890-IEs ::=           SEQUENCE {
    lateNonCriticalExtension      OCTET STRING                  OPTIONAL,
    nonCriticalExtension          Paging-v920-IEs               OPTIONAL
}

Paging-v920-IEs ::=           SEQUENCE {
    cmas-Indication-r9            ENUMERATED {true}             OPTIONAL,   -- Need ON
    nonCriticalExtension          Paging-v1130-IEs              OPTIONAL
}

Paging-v1130-IEs ::=          SEQUENCE {
    eab-ParamModification-r11     ENUMERATED {true}             OPTIONAL,   -- Need ON
    nonCriticalExtension          Paging-v13xx-IEs              OPTIONAL
}

Paging-v13xx-IEs ::=          SEQUENCE {
    sc-PTM-indication             ENUMERATED {true}             OPTIONAL,   -- Need ON
                                  もしくは
    sc-PTM-start-notification     TMGI-List                     OPTIONAL,   -- Need ON
    nonCriticalExtension          SEQUENCE {}                   OPTIONAL
}

[...]

-- ASN1STOP
```

BASE STATION, PROCESSOR, AND USER TERMINAL FOR SETTING A CONFIGURATION TO THE USER TERMINAL FOR DISCONTINUOUSLY MONITORING A PHYSICAL DOWNLINK CONTROL CHANNEL (PDCCH) ON WHICH A CONTROL SIGNAL IS TRANSMITTED BY THE BASE STATION

CROSS-REFERENCE TO RELATED APPLICATIONS

The present application is a Continuation Application based on International Application No. PCT/JP2016/052251 filed on Jan. 27, 2016, which claims the benefit of U.S. Provisional Application No. 62/109,984 filed on Jan. 30, 2015, the content of which is incorporated by reference herein in their entirety.

FIELD

The present application relates to a base station, a processor, and a user terminal in a mobile communication system.

BACKGROUND

In the Third Generation Partnership Project (3GPP), which is a project aiming to standardize a mobile communication system, the specifications of Multimedia Broadcast Multicast Service (MBMS), as a technique for realizing multicast/broadcast transmission, have been laid down.

In the MBMS, a plurality of cells utilize a special subframe called a Multicast-Broadcast Single-Frequency Network (MBSFN) subframe, and a plurality of cells belonging to an identical MBSFN area transmit identical multicast/broadcast data. A user terminal receives the multicast/broadcast data transmitted from the plurality of cells.

In the MBMS, in addition to the MBSFN subframe being used for the MBMS, it is difficult to dynamically change the MBSFN subframe, and thus, a radio resource may not be effectively used.

Meanwhile, in order to realize a multicast transmission while increasing the utilization efficiency of the radio resource, single-cell point-to-multipoint (SCPTM) transmission has been discussed. Unlike the MBMS to which multicast/broadcast transmission per MBSFN is applied area, multicast transmission per cell is applied to the SCPTM. Further, in the SCPTM transmission, a case is assumed where a physical downlink shared channel (PDSCH) is used to transmit multicast data to a plurality of user terminals belonging to a group.

SUMMARY

A base station according to a first aspect is a base station that supports single cell point to multipoint (SC-PTM). The base station comprises: a transmitter configured to transmit a signal to a user terminal; and a controller configured to set a first configuration and a second configuration to the user terminal. The first configuration is a configuration on the user terminal discontinuously monitoring a physical downlink control channel (PDCCH) on which a control signal is transmitted, the control signal being for receiving multicast data transmitted by the SC-PTM from the base station. The first configuration includes an On-duration timer that is a period during which the user terminal receives the PDCCH. The first configuration is a configuration corresponding to a group radio network temporary identifier (RNTI) assigned commonly to a plurality of user terminals that receives identical multicast data by the SC-PTM. The second configuration is a configuration on the user terminal discontinuously monitoring a physical downlink control channel (PDCCH) on which a control signal is transmitted, the control signal being for receiving data transmitted by another transmission method from the base station.

An apparatus according to a second aspect is an apparatus that controls a base station that supports single cell point to multipoint (SC-PTM), the apparatus comprises a processor. The processor executes a process of setting a first configuration and a second configuration to a user terminal. The first configuration is a configuration on the user terminal discontinuously monitoring a physical downlink control channel (PDCCH) on which a control signal is transmitted, the control signal being for receiving multicast data transmitted by the SC-PTM from the base station. The first configuration includes an On-duration timer that is a period during which the user terminal receives the PDCCH. The first configuration is a configuration corresponding to a group radio network temporary identifier (RNTI) assigned commonly to a plurality of user terminals that receives identical multicast data by the SC-PTM. The second configuration is a configuration on the user terminal discontinuously monitoring a physical downlink control channel (PDCCH) on which a control signal is transmitted, the control signal being for receiving data transmitted by another transmission method from the base station.

A user terminal according to a third aspect is a user terminal that supports single cell point to multipoint (SC-PTM). The user terminal comprises: a receiver configured to receive a signal from a base station; and a controller. The receiver receives a first configuration and a second configuration from the base station. The controller sets the first configuration and the second configuration. The first configuration is a configuration on the user terminal discontinuously monitoring a physical downlink control channel (PDCCH) on which a control signal is transmitted, the control signal being for receiving multicast data transmitted by the SC-PTM from the base station. The first configuration includes an On-duration timer that is a period during which the user terminal receives the PDCCH. The first configuration is a configuration corresponding to a group radio network temporary identifier (RNTI) assigned commonly to a plurality of user terminals that receives identical multicast data by the SC-PTM. The second configuration is a configuration on the user terminal discontinuously monitoring a physical downlink control channel (PDCCH) on which a control signal is transmitted, the control signal being for receiving data transmitted by another transmission method from the base station.

BRIEF DESCRIPTION OF THE DRAWINGS

FIGS. 7A to 7C are diagrams for describing a PDCCH monitoring timing according to the first embodiment.

FIG. 8 is a diagram illustrating contents of a DRX-Config according to an operation pattern 2 of the first embodiment.

FIG. 9 is a diagram illustrating contents of subframe configuration information according to an operation pattern 3 of the first embodiment.

FIGS. 10A to 10C are diagrams illustrating configuration information and the like for configuring a part of variables in an operation pattern 4 of the first embodiment.

FIG. 12 is a diagram illustrating a configuration example of a paging message according to the second embodiment.

DESCRIPTION OF THE EMBODIMENT

[Overview of Embodiment]

Figure 1:
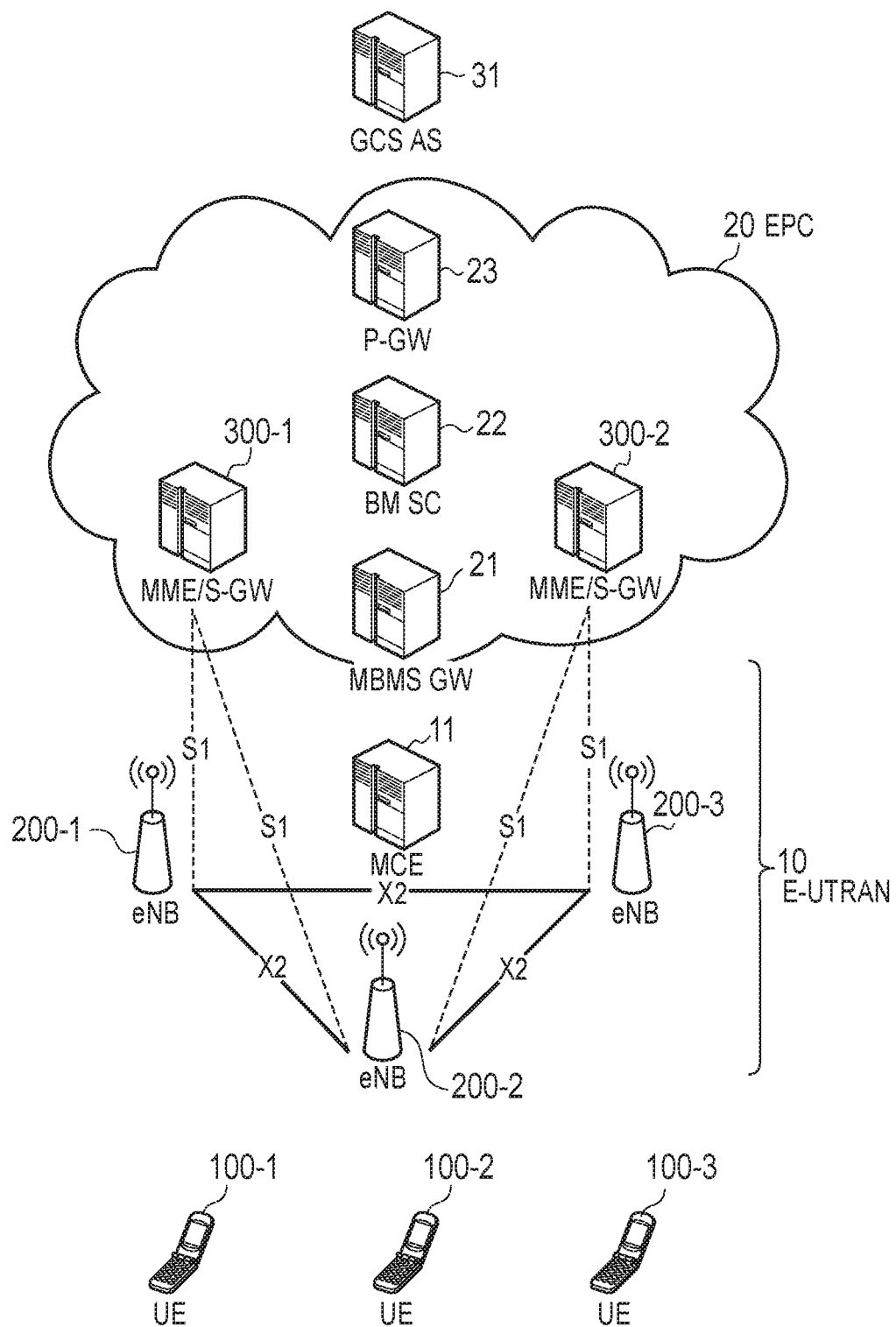
FIG. 1 is a configuration diagram of an LTE system according to a first embodiment and a second embodiment.

An object of the present embodiment is to provide a user terminal and a base station by which it is possible to realize an appropriate SCPTM transmission.

A user terminal according to a first embodiment belongs to a group including a plurality of user terminals. The user terminal comprises: a controller configured to control a DRX operation for discontinuously monitoring a physical downlink control channel; and a receiver configured to receive, on the basis of a monitoring result of the physical downlink control channel, multicast data transmitted from a base station to the plurality of user terminals via a physical downlink shared channel. The controller determines a monitoring timing of the physical downlink control channel in the DRX operation on the basis of a group identifier of the group.

In the first embodiment, the receiver receives scheduling information corresponding to the multicast data by monitoring the physical downlink control channel at the monitoring timing.

In the first embodiment, the controller controls to monitor the physical downlink control channel at both the monitoring timing based on the group identifier and another monitoring timing not based on the group identifier.

In a first modification of the first embodiment, the group identifier is a group RNTI acquired from the base station. The controller holds the group RNTI even when the user terminal transits from a RRC connected mode to a RRC idle mode.

In a second modification of the first embodiment, the controller control to monitor the physical downlink control channel only at the monitoring timing based on the group identifier among the monitoring timing based on the group identifier and the another monitoring timing not based on the group identifier In the second modification of the first embodiment, the receiver receives a paging message from the base station, the paging message including information indicating whether or not the multicast data is transmitted. The controller starts, on the basis of the paging message, the DRX operation based on the group identifier.

A base station according to the first embodiment manages a cell in which a plurality of user terminals belonging to a group exist. The base station comprises: a transmitter configured to transmit scheduling information of a physical downlink shared channel via a physical downlink control channel and transmit multicast data to the plurality of user terminals via the physical downlink shared channel; and a controller configured to designate, on the basis of a group identifier of the group, a monitoring timing at which the plurality of user terminals monitor the physical downlink control channel.

In the first embodiment, the controller allocates the multicast data to a subframe corresponding to the monitoring timing.

In a third modification of the first embodiment, the transmitter transmits a paging message including information indicating whether or not to transmit the multicast data.

A user terminal according to a second embodiment belongs to a group including a plurality of user terminals. The user terminal comprises: a receiver configured to receive a paging message from a base station; and a controller configured to determine whether or not to receive multicast data via a physical downlink shared channel based on the paging message. The paging message includes notification information on whether or not the multicast data is transmitted.

In the second embodiment, the notification information is information indicating a start of transmission of the multicast data or an end of transmission of the multicast data In the second embodiment, the notification information is a group identifier of a group in which transmission of the multicast data is started or a group in which transmission of the multicast data is ended.

In the second embodiment, the receiver receives a message from the base station, the message including resource information on radio resources used to transmit the multicast data. When the start of the transmission of the multicast data is indicated based on the notification information included in the paging message, the controller receives the multicast data by radio resources indicated by the resource information.

In operation pattern 1 of the second embodiment, the message is a broadcast message.

In operation pattern 2 of the second embodiment, the controller requests the base station to notify radio resources used to transmit the multicast data, the message is a unicast message transmitted in response to the request.

In operation pattern 3 of the second embodiment, the controller determines whether or not to start the DRX operation for discontinuously monitoring the physical downlink control channel based on the paging message. The monitoring timing of the physical downlink control channel in the DRX operation is determined based on a group identifier of the group.

A base station according to the second embodiment manages a cell in which a plurality of user terminals belonging to a group exist. The base station comprises: a controller configured to determine whether or not multicast data is transmitted via a physical downlink shared channel; and a transmitter configured to transmit notification information on whether or not to transmit the multicast data.

In the second embodiment, the notification information is information indicating a start of transmission of the multicast data or an end of transmission of the multicast data.

In the second embodiment, the notification information is a group identifier of a group in which transmission of the multicast data is started or a group in which transmission of the multicast data is ended In the second embodiment, the transmitter further transmits a message including resource information on radio resources used to transmit the multicast data.

In operation pattern 1 of the second embodiment, the message is a broadcast message.

In operation pattern 2 of the second embodiment, when a notification of radio resources used to transmit the multicast data is requested from the user terminal, the transmitter transmits the message to the user terminal by unicast.

First Embodiment

Hereinafter, exemplary embodiments when the present disclosure is applied to an LTE system that is a mobile communication system based on the 3GPP standard will be described.

(Overview of LTE System)

First, system configuration of the LTE system will be described. FIG. 1 is a configuration diagram of an LTE system.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an Si interface. The E-UTRAN 10 and the EPC 20 constitute a network.

Further, a GCS AS (Group Communication Service Application Server) 31 is provided outside the EPC 20 (i.e., the Internet). The GCS AS 31 is an application server for group communication. The GCS AS is connected to a BM-SC 22 via a MB2-U interface and a MB2-C interface, and is connected to a P-GW 23 via a SGi interface. The GCS AS 31 performs group management and data distribution (including determination of whether to use MBMS or whether to use unicast) in group communication and the like.

Figure 2:
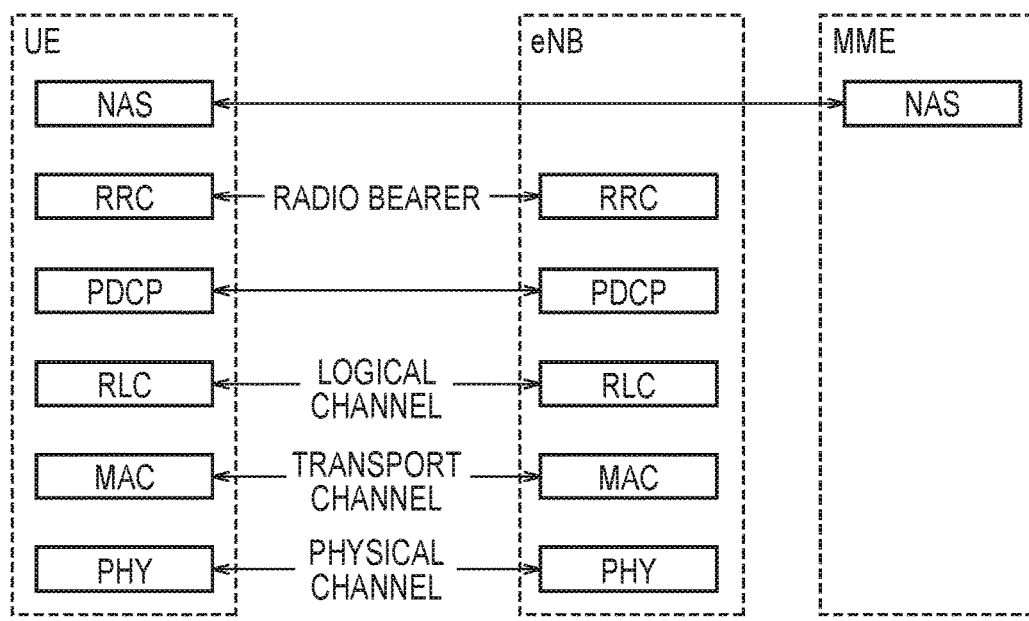
FIG. 2 is a protocol stack diagram of a radio interface according to the first embodiment and the second embodiment.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 3:
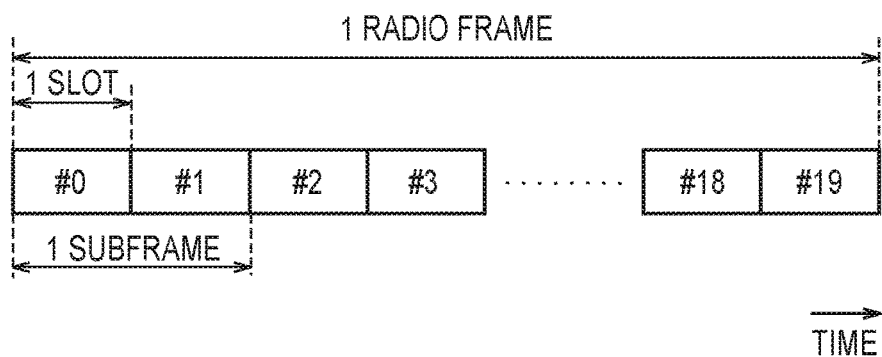
FIG. 3 is a configuration diagram of a radio frame according to the first embodiment and the second embodiment.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. Furthermore, the other portion of each subframe is a region available as a physical downlink shared channel (PDSCH) for mainly transmitting downlink data. Furthermore, in each subframe, a downlink reference signal such as a cell specific reference signal (CRS) is arranged.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data. Furthermore, in each subframe, an uplink reference signal such as a sounding reference signal (SRS) is arranged.

(Configuration of UE 100)

Figure 4:
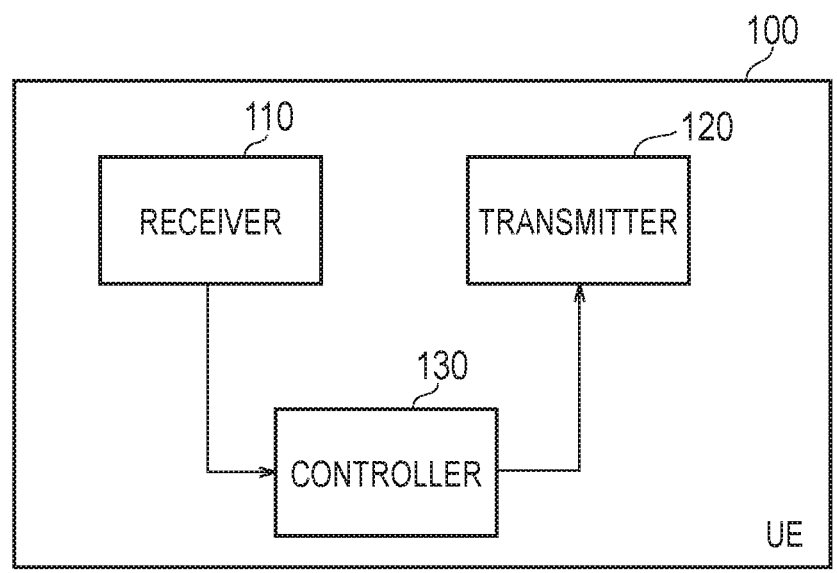
FIG. 4 is a block diagram of a UE according to the first embodiment and the second embodiment.

FIG. 4 is a block diagram of a configuration of the UE 100 (user terminal). As illustrated in FIG. 4, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

The UE 100 may comprise a user interface and a battery. The user interface is an interface with a user possessing the UE 100, and includes, for example, a display, a microphone, a speaker, various buttons, and the like. The user interface receives an operation from the user and outputs a signal indicating the content of the operation to the controller 130. The battery stores electric power to be supplied to each block of the UE 100.

(Configuration of eNB 200)

Figure 5:
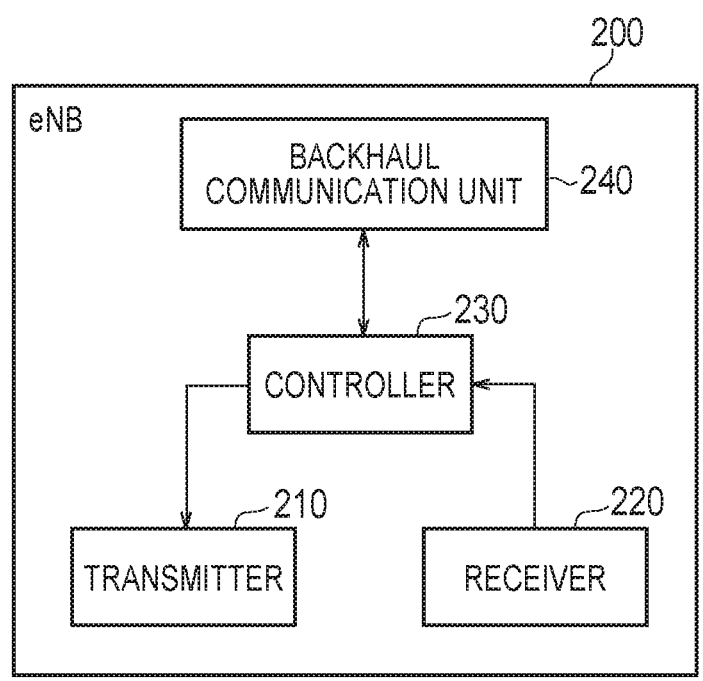
FIG. 5 is a block diagram of an eNB according to the first embodiment and the second embodiment.

FIG. 5 is a block diagram of the eNB 200 (base station). As illustrated in FIG. 5, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 130 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is used for backhaul communication with other eNB 200s and the aforementioned network entity.

(Overview of Single-Cell PTM Transmission)

Figure 6:
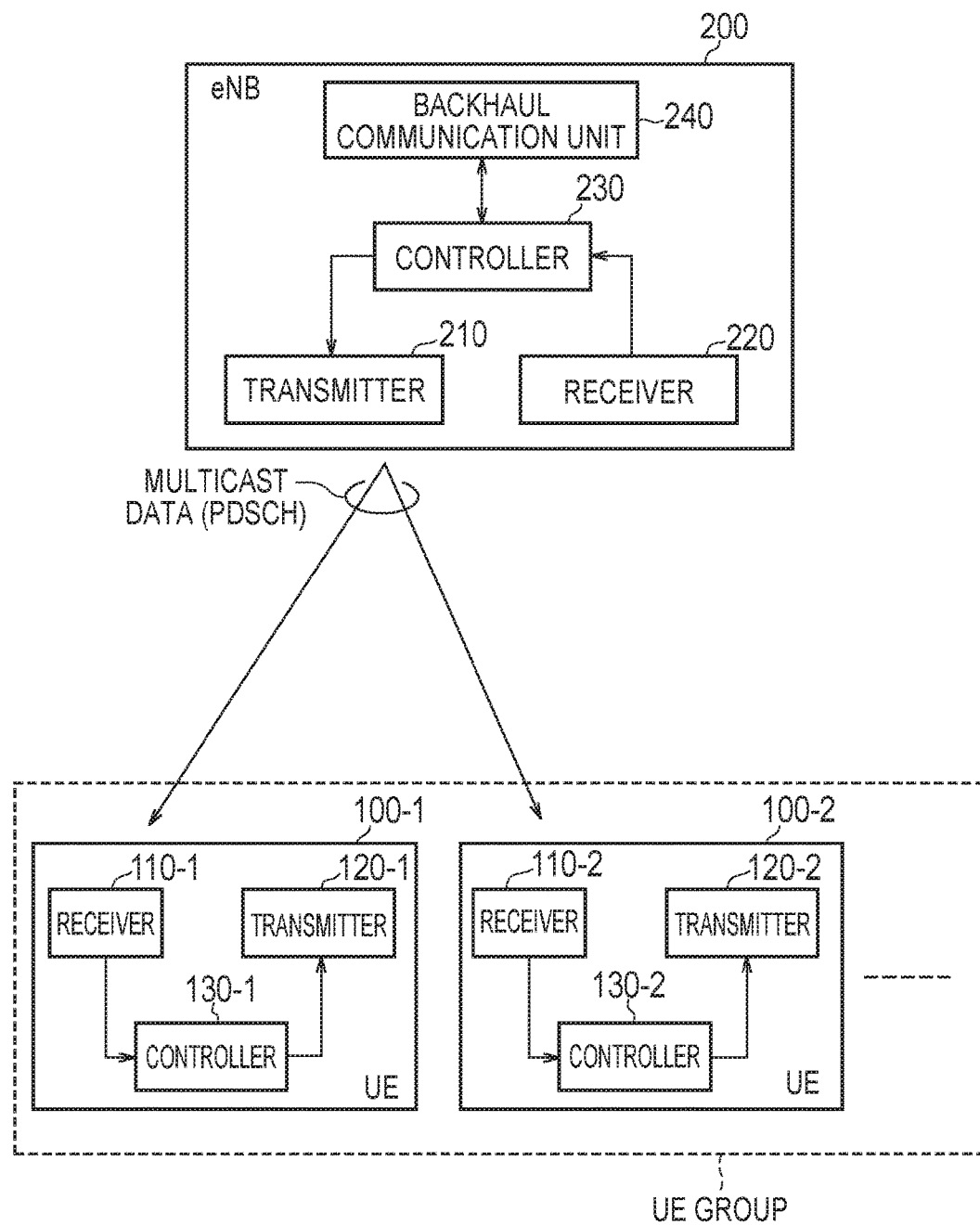
FIG. 6 is a diagram for describing SCPTM according to the first embodiment and the second embodiment.

Below, single-cell PTM transmission (SCPTM) will be described. With the SCPTM, multicast transmission is realized while increasing the utilization efficiency of a radio resource. FIG. 6 is a diagram for describing an SCPTM-related operation according to the first embodiment.

As illustrated in FIG. 6, in the SCPTM, the eNB 200 uses the PDSCH to transmit multicast data by a single cell. That is, unlike the MBMS to which multicast/broadcast transmission per MBSFN area is applied, multicast transmission per cell is applied to the SCPTM.

A plurality of UEs 100 (UE 100-1, UE 100-2 . . . ) configured to receive identical multicast data configure a UE group. Each UE 100 in the UE group is assigned with a common group identifier. The group identifier is, for example, a temporary mobile group identity (TMGI) or a group radio network temporary identifier (RNTI). The group identifier is assigned by the eNB 200 (or the MCE 11). Alternatively, the group identifier may be assigned by an entity of the core network (EPC 20). Alternatively, the group identifier may be assigned by an application server (GCS AS 31, for example).

A typical application to which the SCPTM is applied is group communication service (group call service, for example). In the group communication service, multicast transmission is applied to downlink, and unicast transmission is applied to uplink.

(Overview of DRX Operation)

A discontinuous reception (DRX) operation will be described, below.

The UE 100 is capable of performing a DRX operation in order to save a battery. The UE 100 performing the DRX operation discontinuously monitors a PDCCH. Normally, a PDCCH in a subframe carries scheduling information (information on a radio resource and a transport format) of a PDSCH in the subframe.

If the UE 100 is in an RRC idle mode, the UE 100 performs the DRX operation to discontinuously monitor the PDCCH in order to receive a paging message notifying an incoming call. The paging message may be included in a common search space of the PDCCH. A PDCCH monitoring timing in the UE 100 is normally determined, based on an identifier (International Mobile Subscriber Identity (IMSI)) of the UE 100. Therefore, the PDCCH monitoring timing often differs for each UE 100.

If the UE 100 is in the RRC connected mode, the UE 100 performs the DRX operation when there is no data to be communicated for a predetermined period. The UE 100 in a DRX operation state periodically, that is, discontinuously monitors the PDCCH. The period during which to monitor the PDCCH is referred to as "On-duration" of the DRX. Further, a cycle in which the On-duration is configured is referred to as "DRX cycle". The On-duration and the DRX cycle follow a DRX configuration (DRX-Config) configured by an RRC message. Therefore, the PDCCH monitoring timing often differs for each UE 100.

In this manner, the UE 100 is capable of performing the DRX operation to save a battery. Meanwhile, the above-described SCPTM transmission is a technique to transmit the multicast data via the PDSCH. Therefore, in order for a plurality of UEs 100 performing the DRX operation to receive the multicast data, the DRX operations in the plurality of UEs 100 needs to be aligned. However, the configure content of the DRX operation differs for each UE 100, and hence, it is difficult to appropriately perform the SCPTM transmission.

(Operation of UE 100)

Hereinafter, an operation of the UE 100 according to the first embodiment will be described. Specifically, an operation for compatibly achieving the above-described SCPTM transmission and DRX operation will be described.

The UE 100 according to the first embodiment belongs to a UE group including a plurality of UEs 100. The UE group is a group that performs group communication based on the SCPTM transmission. The controller 130 of the UE 100 controls the DRX operation to discontinuously monitor the PDCCH. The receiver 110 of the UE 100 receives, based on a monitoring result of the PDCCH, multicast data (hereinafter, referred to as "SCPTM data") to be transmitted from the eNB 200 to the plurality of UEs 100 via the PDSCH.

In the first embodiment, the controller 130 of the UE 100 determines, based on a group identifier of the UE group of the UE 100, the PDCCH monitoring timing in the DRX operation. In this manner, the UE 100 determines the PDCCH monitoring timing based on the group identifier, and thus it is possible to align PDCCH monitoring timings for each UE group. Details of a determination operation of the PDCCH monitoring timing will be described later.

It is noted that, if the UE 100 belongs to a plurality of UE groups, a plurality of PDCCH monitoring timing configurations (DRX configurations) corresponding to the plurality of UE groups may be applied.

The receiver 110 of the UE 100 receives scheduling information corresponding to the SCPTM data by monitoring the PDCCH at the PDCCH monitoring timing. Thereby, the receiver 110 can receive the PDSCH (SCPTM data), based on the scheduling information.

In the first embodiment, the controller 130 of the UE 100 controls so as to monitor the PDCCH at both timings of a PDCCH monitoring timing based on the group identifier and a PDCCH monitoring timing not based on the group identifier.

Here, the PDCCH monitoring timing not based on the group identifier is a normal PDCCH monitoring timing according to the existing 3GPP specification. Specifically, if the UE 100 is in the RRC idle mode, the PDCCH monitoring timing not based on the group identifier is a PDCCH monitoring timing determined, based on the IMSI. If the UE 100 is in the RRC connected mode, the PDCCH monitoring timing not based on the group identifier is a PDCCH monitoring timing determined, based on a normal DRX-Config.

FIGS. 7A to 7C are diagrams for describing the PDCCH monitoring timing according to the first embodiment. The PDCCH monitoring timing illustrated in FIG. 7A is a normal PDCCH monitoring timing (normal DRX configuration). The PDCCH monitoring timing illustrated in FIG. 7B is the PDCCH monitoring timing based on a group identifier (group DRX configuration). As illustrated in FIG. 7C, the UE 100 monitors the PDCCH at both timings of the normal PDCCH monitoring timing and the PDCCH monitoring timing based on the group identifier.

(Operation of eNB 200)

Hereinafter, an operation of the eNB 200 according to the first embodiment will be described. Specifically, an operation for compatibly achieving the above-described SCPTM transmission and DRX operation will be described.

The eNB 200 according to the first embodiment manages a cell in which a plurality of UEs 100 belonging to a UE group exist. The transmitter 210 of the eNB 200 transmits scheduling information of the PDSCH via the PDCCH, and transmits the SCPTM data to the plurality of UEs 100 via the PDSCH. The controller 230 of the eNB 200 designates, based on a group identifier of the UE group, a PDCCH monitoring timing at which the plurality of UEs 100 monitors the PDCCH. Specifically, the eNB 200 specifies the PDCCH monitoring timing in the UE 100 by performing a determination operation similar to the determination operation of the PDCCH monitoring timing in the UE 100. Details of the determination operation of the PDCCH monitoring timing will be described later.

In the first embodiment, the transmitter 210 of the eNB 200 transmits scheduling information corresponding to the SCPTM data at the specified PDCCH monitoring timing. That is, multicast data is allocated to a subframe corresponding to the PDCCH monitoring timing. Thereby, a UE 100 belonging to the UE group and performing a DRX operation is capable of receiving the scheduling information to receive the PDSCH (SCPTM data), based on the received scheduling information.

(Determination Operation of PDCCH Monitoring Timing)

Hereinafter, the determination operation of a PDCCH monitoring timing according to the first embodiment will be described.

(1) Operation Pattern 1

An operation pattern 1 is an operation pattern for determining a PDCCH monitoring timing in a DRX operation in the RRC idle mode, based on a group identifier rather than an IMSI. A PDCCH monitoring timing (PDCCH monitoring subframe) in a DRX operation in an RRC idle mode is referred to as "Paging Occasion (PO)".

The UE 100 (and the eNB 200) calculates a Paging Occasion (PO) and a Paging Frame (PF) which is a radio frame that may include the Paging Occasion, as follows.

A system frame number (SFN) of the PF is determined by the following formula (1).

$$\text{SFN mod } T = (T \text{ div } N)^*(\text{group identifier mod } N) \quad (1)$$

Here, T is a DRX cycle of the UE 100 to receive a paging message, and is represented by the number of radio frames. Of T and nB, N is a minimum value. nB is a value selected from 4T, 2T, T, T/2, T/4, T/8, T/16, and T/32. The group identifier is a TMGI or a group RNTI, as described above. Instead of using the group identifier as it is, for example, a value determined by "group identifier mod 1024" may be used. It is noted that, if a device other than the eNB 200 assigns a group identifier, the assigned group identifier is notified from the device to the eNB 200.

Of the PFs determined in this manner, a subframe number of the PO is determined as follows. First, index i_s is determined by the following formula (2).

$$i\_s = \text{floor}(\text{group identifier}/N) \text{ mod } Ns \quad (2)$$

Here, of 1 and nB/T, Ns is a maximum value.

Next, a PO corresponding to Ns and index i_s is determined from Table 1 or Table 2. Table 1 is applied to an LTE FDD system, and Table 2 is applied to an LTE TDD system. In Table 1 and Table 2, N/A represents not applicable.

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

The determination operation of a PDCCH monitoring timing according to the operation pattern 1 is applicable not only to the case of the RRC idle mode, but also to the case of the RRC connected mode.

(2) Operation Pattern 2

An operation pattern 2 is an operation pattern for notifying the UE 100, from the eNB 200, of a DRX-Config to define a PDCCH monitoring timing in a DRX operation in the RRC connected mode, by designating a group identifier.

FIG. 8 is a diagram illustrating contents of the DRX-Config according to the operation pattern 2. The DRX-Config is notified, by an RRC message, from the eNB 200 to the UE 100. As illustrated in FIG. 8, the DRX-Config according to the operation pattern 2 is defined as a DRX-Config for a group DRX (GroupDRX-Config). As illustrated in the dashed line frame in FIG. 8, the GroupDRX-Config includes a group identifier (TMGI and/or group RNTI) to which the GroupDRX-Config is applied. The UE 100 determines, based on a GroupDRX-Config corresponding to the group identifier of the UE group of the UE 100, a PDCCH monitoring timing (such as On-duration and DRX cycle).

The determination pattern of a PDCCH monitoring timing according to the operation pattern 2 is applicable not only to the case of the RRC connected mode, but also to the case of the RRC idle mode.

(3) Operation Pattern 3

An operation pattern 3 is an operation pattern for notifying the UE 100, from the eNB 200, of configuration information indicating a subframe corresponding to a PDCCH monitoring timing, by designating a group identifier.

FIG. 9 is a diagram illustrating contents of subframe configuration information (SCPTM-SubframeConfig) according to the operation pattern 3. As illustrated in FIG. 9, the SCPTM-SubframeConfig includes, in addition to a parameter to define a PDCCH monitoring timing (subframe), a group identifier (TMGI and/or group RNTI) to which the SCPTM-SubframeConfig is applied. The UE 100 determines, based on the SCPTM-SubframeConfig corresponding to the group identifier of the UE group of the UE 100, a PDCCH monitoring timing (subframe).

The determination operation of a PDCCH monitoring timing according to the operation pattern 3 is applicable to both of the RRC connected mode and the RRC idle mode.

(4) Operation Pattern 4

An operation pattern 4 is an operation pattern obtained by modifying the operation pattern 1.

In a DRX operation in the RRC idle mode, the followings are considered from the characteristic of a paging message.

For power saving of a UE, a long cycle is adopted.

A subframe that can be used for paging is limited. (Up to 0, 4, 5, 9 subframes)

There is a possibility that a radio frame in which a paging message is transmitted is limited. (nB=T/2, ... T/32)

Hence, it may not be preferable to divert paging configuration (PCCH Config) and Paging Frame (PF) and Paging Occasion (PO) calculation formulas for the purpose of receiving group communication (SCPTM).

Therefore, in the operation pattern 4, by utilizing the following formula, for example, group communication may be received by using a parameter for the group communication. A PF (which may also be referred to as "Reception Frame") is determined from the following formula (3).

$$\text{SFN mod } T_{Group} = T_{Group} * (\text{UE\_ID}_{Group} \text{ mod } T_{Group}) \quad (3)$$

Further, a PO (it may also be referred to as "Reception Occasion") is determined from the following formula (4).

$$i\_s_{Group} = \text{UE\_ID}_{Group} \text{ mod } Ns_{Group} \quad (4)$$

Here, variables in the formulas (3) and (4) are shown in Table 3.

TABLE 3

| Variable | Description |
|---|---|
| UE_ID$_{Group}$ | UE_ID$_o$ for group communication. Value calculated from group identifier (TMGI and/or group RNTI). (For example, TMGI or group RNTI mod 1024) |
| T$_{Group}$ | Cycle for group communication (DRX cycle) Value shorter than normal DRX, such as 1, 2, 4, 8, and 16 RFs. |
| i_S$_{Group}$ | A value indicating subframe in which group communication is transmitted. |
| NS$_{Group}$ | Number of subframes used for group communication. For example, all 10 subframes. |

Unlike DRX in a normal RRC idle mode, in the formula (3), a change is made so as to be able to ignore nB for paging and select any radio frame. Further, in the formula (4), a limitation of a subframe is changed to for group communication.

FIGS. 10A to 10C are diagrams illustrating configuration information (GroupComm-Config) and the like for configuring a part of variables in the operation pattern 4. The Group Comm-Config is notified, by an RRC message, from the eNB 200 to the UE 100.

As illustrated in FIG. 10A, the GroupComm-Config includes "GroupPagingCycle" which is a cycle (DRX cycle) for group communication and "Group Occasion". FIG. 10B illustrates an example of "GroupOccasion", and FIG. 10C illustrates an example of "i_s$_{Group}$".

It is noted that the determination operation of a PDCCH monitoring timing according to the operation pattern 4 is applicable not only to the case of the RRC idle mode, but also to the case of the RRC connected mode.

(Summary of First Embodiment)

In the first embodiment, the UE 100 determines, based on a group identifier of a UE group of the UE 100, a PDCCH monitoring timing in a DRX operation. In this manner, the UE 100 determines a PDCCH monitoring timing, based on a group identifier, and thus it is possible to align PDCCH monitoring timings for each UE group.

[First Modification of First Embodiment]

In the above-described first embodiment, when using a group RNTI assigned by the eNB 200 (or the MCE 11) as a group identifier, it is preferable to keep the group RNTI even when the UE 100 transits to the RRC idle mode. This is because even when some UEs 100 in a UE group transit to the RRC idle mode, the remaining UEs 100 can be in the RRC connected mode, and thus, a PDCCH monitoring timing of each UE 100 in the UE group needs to be aligned.

Therefore, in a first modification of the first embodiment, the controller 130 of the UE 100 keeps the group RNTI even when the UE 100 transits from the RRC connected mode to the RRC idle mode. Then, the controller 130 of the UE 100 determines, based on the kept group RNTI, a PDCCH monitoring timing. It is noted that the eNB 200 (or the MCE 11) configures, to the UE 100 in the RRC idle mode, a group RNTI by an RRC message (or a MAC message), for example.

Figure 11:
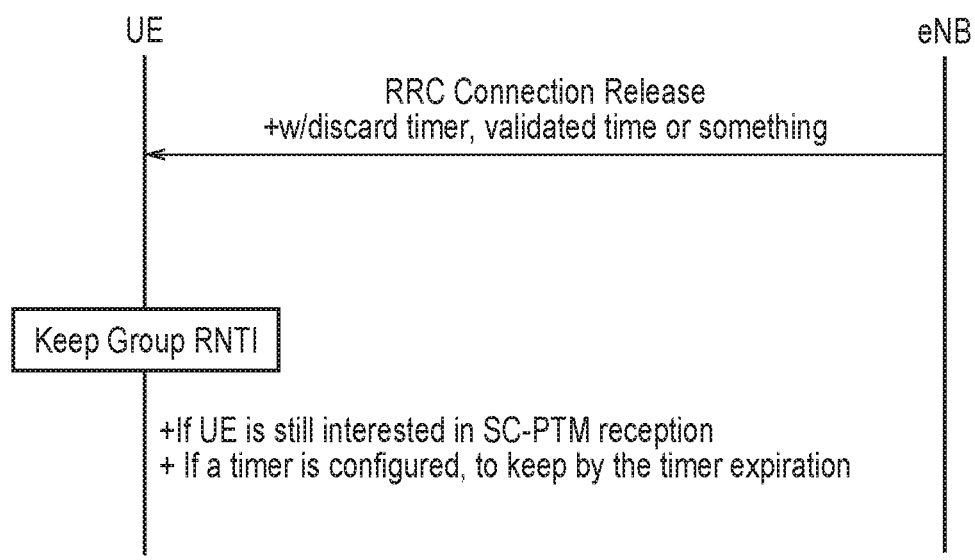
FIG. 11 is a sequence diagram according to a first modification of the first embodiment.

Further, configuration information on keeping and/or releasing of a group RNTI may be notified from the eNB 200 to the UE 100. FIG. 11 is a sequence diagram according to the first modification of the first embodiment. As illustrated in FIG. 11, the eNB 200 may include configuration information on keeping and/or releasing of a group RNTI in an "RRC Connection Release" message for releasing an RRC connection with the UE 100. The eNB 200 may transmit, to the UE 100, the configuration information, based on a GC indication received from the UE 100.

The configuration information includes a timer value that defines a period for keeping a group RNTI. The UE 100 may activate a timer when transitioning to the RRC idle mode, and keep the group RNTI until the timer reaches a set timer value. It is noted that, if the UE 100 is interested in receiving the SCPTM, the group RNTI may be kept until the timer expires, and if the UE 100 is not interested in receiving the SCPTM, the group RNTI may be discarded regardless of whether or not the timer value is reached.

Further, FIG. 11 is a sequence for performing a configuration related to keeping and/or releasing of a group RNTI by using the "RRC Connection Release" message, however, a method not using the "RRC Connection Release" message may be used. For example, in the RRC connected mode, a set timer value is received from the eNB 200, or a set timer value is preset to the UE 100. Then, the timer is activated upon the RRC Connection Release, and if the timer value reaches the set timer value (if the timer expires), the group RNTI is released.

[Second Modification of First Embodiment]

In the above-described first embodiment, the controller 130 of the UE 100 controls so as to monitor the PDCCH at both timings of a PDCCH monitoring timing based on a group identifier and a PDCCH monitoring timing not based on a group identifier (normal PDCCH monitoring timing). However, only the PDCCH monitoring timing based on a group identifier may be applied instead of applying the normal PDCCH monitoring timing.

In a second modification of the first embodiment, the controller 130 of the UE 100 controls so as to monitor the PDCCH only at a PDCCH monitoring timing based on a group identifier, of a PDCCH monitoring timing based on a group identifier and other PDCCH monitoring timing not based on a group identifier (normal PDCCH monitoring timing). The controller 230 of the eNB 200 recognizes that the UE 100 discards or suspends a normal DRX configuration.

In this case, the eNB 200 preferably transmits, to the UE 100, information to be transmitted to the UE 100 in accordance with a normal PDCCH monitoring timing, in accordance with the PDCCH monitoring timing based on a group identifier.

[Third Modification of First Embodiment]

The above-described determination operation of a PDCCH monitoring timing (DRX operation based on a group identifier) according to the first embodiment may not be necessarily always performed. For example, before transmission of SCPTM data starts, the UE 100 may not need to perform DRX operation based on a group identifier.

In a third modification of the first embodiment, the transmitter 210 of the eNB 200 transmits a paging message including information indicating whether or not to transmit the SCPTM data. The receiver 110 of the UE 100 receives, from the eNB 200, the paging message including information indicating whether or not the SCPTM data is transmitted. The controller 130 of the UE 100 starts the DRX operation based on the group identifier, based on the paging message. For example, if information indicating the SCPTM data being transmitted is included in the paging message, the controller 130 of the UE 100 starts the DRX operation based on the group identifier. Details of such paging message will be described in a second embodiment.

Second Embodiment

A second embodiment will be described with a particular focus on a difference from the first embodiment.

The above-described first embodiment is an embodiment that determines, based on a group identifier, a PDCCH monitoring timing in a DRX operation. Meanwhile, the second embodiment is an embodiment that controls, based on a paging message, whether or not to monitor the PDCCH.

(Operation of UE 100)

Hereinafter, an operation of the UE 100 according to the second embodiment will be described.

The UE 100 according to the second embodiment belongs to a UE group including a plurality of UEs 100. The receiver 110 of the UE 100 receives a paging message from the eNB 200. The controller 130 of the UE 100 determines, based on the paging message, whether or not to receive SCPTM data. The paging message includes notification information on whether or not the SCPTM data is transmitted to the plurality of UEs 100 (that is, SCPTM transmission) via the PDSCH, and a group identifier of the UE group.

In this manner, the eNB 200 notifies, by the paging massage, the availability of the SCPTM data transmitted by using the SCPTM, and thus a UE 100 belonging to the corresponding UE group is capable of receiving the SCPTM data at an appropriate timing.

FIG. 12 is a diagram illustrating a configuration example of a paging message according to the second embodiment. As illustrated in the dashed line frame in FIG. 12, notification information is notification information (an sc-PTM-indication) indicating the start of transmission of the SCPTM data (or the end of transmission of the SCPTM data). Alternatively, the notification information is a group identifier list (TMGI-List) of a UE group in which transmission of the SCPTM data is started (or the UE group in which transmission of the SCPTM data is ended). The paging message may further include information indicating presence or absence of a configuration change of the notification information. Alternatively, with replacing "presence or absence of a configuration change of the notification information" with "the notification information", the message may be transmitted. Further, "presence or absence of a configuration change" may specifically indicate that an SC-PTM transmission status has changed from the start to the end, or vice versa.

In the second embodiment, the receiver 110 of the UE 100 receives, from the eNB 200, a message including resource information on a radio resource used for transmitting the SCPTM data. If the start of the transmission of the SCPTM data is indicated on the basis of the notification information included in the paging message, the controller 130 of the UE 100 receives multicast data by the radio resource indicated by the resource information. If necessary, prior to the reception of multicast data, the PDCCH is monitored. Details of such a sequence will be described later.

(Operation of eNB 200)

Hereinafter, an operation of the eNB 200 according to the second embodiment will be described.

The eNB 200 according to the second embodiment manages a cell in which a plurality of UEs 100 belonging to a UE group exists. The controller 230 of the eNB 200 determines whether or not to transmit SCPTM data (that is, SCPTM transmission) via the PDSCH. The transmitter 210 of the eNB 200 transmits a paging message including notification information on whether or not to transmit the SCPTM data, and a group identifier of the group.

As described above, the notification information is information indicating the start of transmission of the SCPTM data (or the end of transmission of the SCPTM data). Alternatively, the notification information is a group identifier list of a group in which transmission of the SCPTM data is started (or a group in which transmission of the SCPTM data is ended).

In the second embodiment, the transmitter 210 of the eNB 200 further transmits a message including resource information on a radio resource used for transmitting the SCPTM data.

(Operation Sequence)

Hereinafter, an operation sequence according to the second embodiment will be described.

(1) Operation Pattern 1

Figure 13:
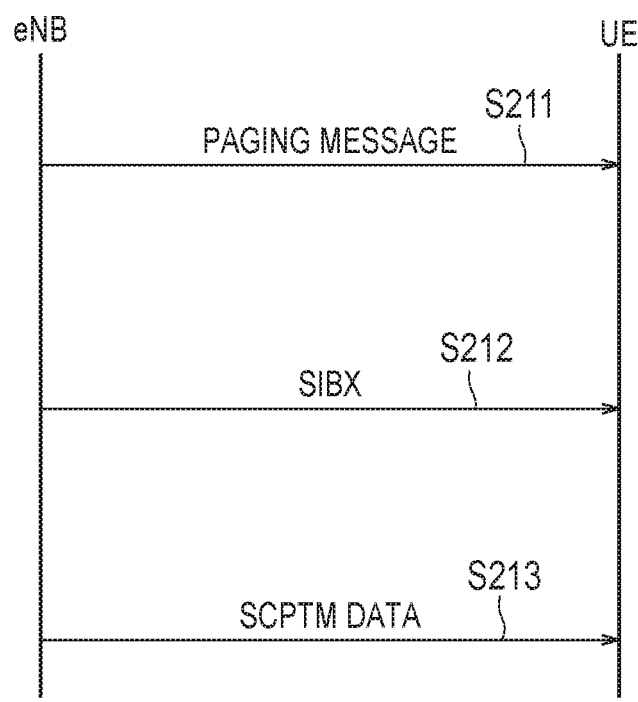
FIG. 13 is a sequence diagram illustrating an operation pattern 1 of the second embodiment.

FIG. 13 is a sequence diagram illustrating an operation pattern 1 according to the second embodiment. In the operation pattern 1, a message including resource information on a radio resource used for transmitting SCPTM data is a broadcast message (broadcast RRC message). Such a broadcast RRC message is referred to as "SIB X".

As illustrated in FIG. 13, in step S211, the eNB 200 determines the start of transmission of SCPTM data to a specific UE group. The eNB 200 transmits a paging message including information indicating the start of the transmission of the SCPTM data, and a group identifier of the specific UE group. A UE 100 belonging to the specific UE group receives the paging message, and determines reception of the multicast data.

To receive the SIB X, the UE 100 first receives an SIB1 from the eNB 200, and acquires, based on the SIB1, scheduling information of the SIB X.

In step S212, the eNB 200 transmits the SIB X including resource information on a radio resource used for transmitting the SCPTM data. The SIB X includes resource information for each UE group (group identifier). The UE 100 receives the SIB X, and acquires the resource information corresponding to the UE group of the UE 100. The SIB X may include a group RNTI for performing the operation according to the first embodiment.

The resource information includes information indicating a subframe used for transmitting the SCPTM data. The subframe used for transmitting the SCPTM data may be a subframe in which the SCPTM data may be transmitted. In this case, the UE 100 monitors the PDCCH in the subframe. It is noted that the information indicating the subframe may be represented in a bitmap format. For example, it is a bitmap consisting of bits that set a subframe used for transmitting the SCPTM data to "1", and a subframe not used for transmitting the SCPTM data to "0".

Alternatively, the resource information may be more detailed information. For example, the resource information includes information on a radio resource (subframe, resource block) used for transmitting the SCPTM data, a transport format, and the like. In this case, the UE 100 is not necessarily required to monitor the PDCCH in the subframe.

In step S213, the eNB 200 transmits the SCPTM data by using a radio resource indicated by the resource information in the SIB X. The UE 100 receives the SCPTM data, based on the resource information in the SIB X.

(2) Operation Pattern 2

Figure 14:
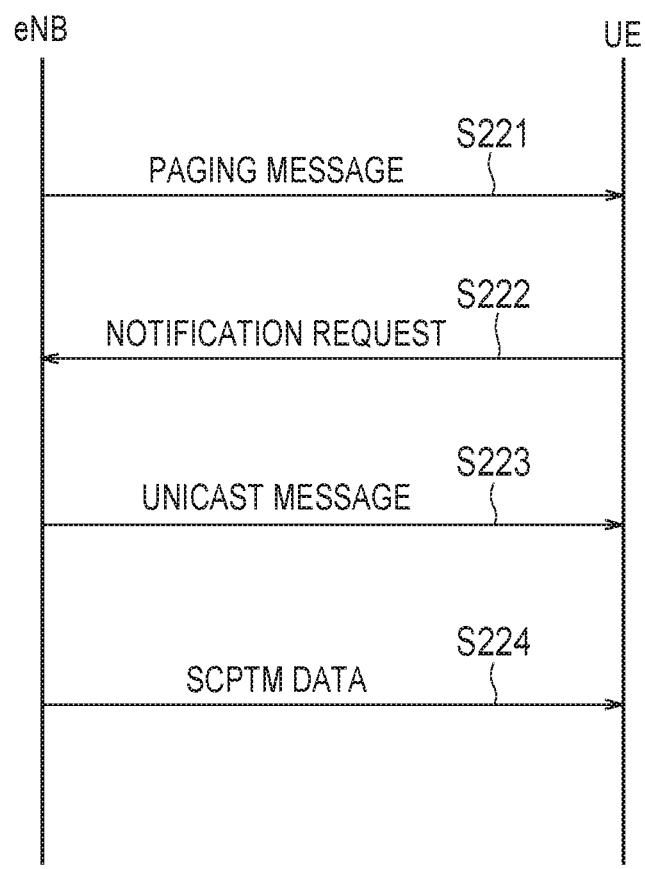
FIG. 14 is a sequence diagram illustrating an operation pattern 2 of the second embodiment.

FIG. 14 is a sequence diagram illustrating an operation pattern 2 according to the second embodiment. In the operation pattern 2, a message including resource information on a radio resource used for transmitting SCPTM data is a unicast message (for example, an individual RRC message).

As illustrated in FIG. 14, in step S221, the eNB 200 determines the start of transmission of SCPTM data to a specific UE group. The eNB 200 transmits a paging message including information indicating the start of the transmission of the SCPTM data, and a group identifier of the specific UE group. A UE 100 belonging to the specific UE group receives the paging message, and determines reception of the multicast data.

In step S222, the UE 100 requests the eNB 200 to notify a radio resource used for transmitting the SCPTM data. Such a message is, for example, a group communication interest notification. The group communication interest notification may include a group identifier (for example, TMGI) corresponding to the group communication in which the UE 100 is interested. Specifically, the group communication interest notification may be a "GC indication", and the "GC indication" may include a TMGI list.

In step S223, the eNB 200 transmits, to the UE 100, a unicast message including resource information in response to the request from the UE 100. For example, the eNB 200 notifies the UE 100 of the resource information corresponding to the group identifier included in the group communication interest notification, by the unicast message. The configuration of the resource information is similar to that in the operation pattern 1.

In step S224, the eNB 200 transmits the SCPTM data by using the radio resource indicated by the resource information in the unicast message. The UE 100 receives the SCPTM data, based on the resource information in the unicast message.

(3) Operation Pattern 3

An operation pattern 3 is an operation pattern that is similar to the third modification of the first embodiment described above. The UE 100 determines, based on a paging message, whether or not to start a DRX operation. A PDCCH monitoring timing in the DRX operation is determined, based on the group identifier of the UE group of the UE 100.

(Summary of Second Embodiment)

As described above, the eNB 200 notifies, by the paging massage, the availability of the SCPTM data transmitted by using the SCPTM, and thus the UE 100 belonging to the corresponding UE group is capable of receiving the SCPTM data at an appropriate timing.

Other Embodiments

The first embodiment and the second embodiment described above are not limited to a case where they are separately and independently performed. The first embodiment and the second embodiment may be combined to be implemented.

In the above-described first embodiment and second embodiment, the LTE system is exemplified as the mobile communication system. However, the present application is not limited to the LTE system. The present application may be applied to systems other than the LTE system.

APPENDIX

Introduction

A new study item on support of single-cell point-to-multipoint (PTM) transmission is approved. For the critical communication and the commercial use cases such as top videos/popular apps download, mobile advertising and traffic information for cars, the study item will investigate more flexible/efficient radio interface for group communication, comparing to Rel-12 eMBMS-based mechanism. One of the big challenges in the Rel-13 study is expected as "dynamic multicast" over PDSCH, where the objective of study was identified as follows.

Study a method for UE to receive the DL multicast over PDSCH that is intended for a group of users (i.e. users that have common interest on a particular service/content).

Discuss whether HARQ feedback and CSI report are still necessary for single-cell PTM transmission, and if so identify possible solutions.

Study service continuity aspects.

In this appendix, assuming PDSCH would be used for the single-cell PTM, some possible issues are identified from the perspective of single-cell PTM reception.

(Discussion)

Based on our understanding of this study item, the intention is for the UE to perform the single-cell PTM reception either the idle mode or the connected mode. Since the SID mentions clearly that the solution should be able to complement an MBSFN deployment in the same cell, UEs in idle mode should be able to receive both the single-cell PTM signals and eMBMS reception. Considering the use cases for critical communication such as push-to-talk, the UEs in connected mode which transmits voice data are also likely to receive the single-cell PTM transmissions. Therefore, the single-cell PTM reception should be performed in both idle mode and connected mode.

Proposal 1: It should be assumed that the single-cell PTM reception is performed in both RRC_IDLE and RRC_CONNECTED.

If PDCCH is assumed for the multicast transmission with the single-cell PTM, the following issues such as DRX, and PDCCH monitoring should be considered. Comparing to eMBMS reception which is performed independent of DRX, one of the challenges in the single-cell PTM reception in the connected mode is to allow the reception to work within the existing DRX mechanism. The challenges stems from subframe alignment between DRX and single-cell PTM. While the MBSFN subframes are completely separate from normal subframes, the single-cell PTM transmissions may occur within normal subframes since it may be mapped to the PDSCH and scheduled by PDCCH.

In the current idle mode procedure, the UE is required to monitor PDCCH only in the paging occasion which is randomized by UE-ID, while the UE in connected mode is required to monitor PDCCH during Active Time and controlled by the serving cell through dedicated signalling. Further discussion is needed to determine the PTM transmission occasions that would be applicable for all UEs within the same group. In other words, the opportunities for PDCCH monitoring should be aligned for all UEs assigned to the same group.

Proposal 2: It should be discussed how to align sufficient opportunities for PDCCH monitoring all UEs assigned to the same group, if PDSCH is assumed for the single-cell PTM transmission.

The following alternatives may be considered;

ALT 1: Extend the existing DRX mechanisms in the idle mode and in the connected mode.

ALT 2: Introduce a new DRX mechanism independent of the existing DRX mechanisms.

ALT 3: Leave up to smart eNB implementation.

ALT 1 may be considered the baseline mechanism, although the issue may have impacts on backward compatibility from the eNB's point of view, i.e., it may be difficult to change the DRX occasions especially in the idle mode.

ALT 2 may be a simpler way if the DRX rule relates to some sort of group ID, e.g., TMGI or Group-RNTI, although more standardization efforts are expected.

ALT 3 may be considered the simplest alternative from the standardization perspective.

However, it should be considered how the eNB knows the UE-IDs of IDLE UEs belonging to the same group and how the paging occasions should be aligned to the DRX OnDurations for all UEs in the connected mode. Due to the difficulty in supporting all UEs interested in the data delivery in ALT 3 and the impact to backwards compatibility in ALT 1, RAN2 should consider whether a new DRX mechanism would be needed to support SC-PTM receptions for both IDLE and CONNECTED UEs.

Proposal 3: RAN2 should discuss whether a new DRX mechanism is needed for the single-cell PTM reception.

CONCLUSION

In this appendix, the issue with DRX alignment for the single-cell PTM is considered.

Three alternatives are provided which may be used as basis for further considerations to resolve the DRX alignment issue.

INDUSTRIAL APPLICABILITY

The present application is useful in the field of communication.

The invention claimed is:

1. A base station that supports single cell point to multipoint (SC-PTM), comprising:
a transmitter configured to transmit a signal to a user terminal; and
a controller configured to set a first configuration and a second configuration to the user terminal, wherein
the first configuration is a configuration in which the user terminal discontinuously monitors a physical downlink control channel (PDCCH) on which a control signal is transmitted, the control signal being for receiving multicast data transmitted by the SC-PTM from the base station,
the first configuration includes an On-duration timer that is a period during which the user terminal receives the PDCCH,
the first configuration is a configuration corresponding to a group radio network temporary identifier (RNTI) assigned commonly to a plurality of user terminals that receive identical multicast data by the SC-PTM, and the second configuration is a configuration in which the user terminal discontinuously monitors a physical downlink control channel (PDCCH) on which a control signal is transmitted, the control signal being for receiving data transmitted by a transmission method different from the SC-PTM, from the base station.

2. An apparatus that controls a base station that supports single cell point to multipoint (SC-PTM), comprising:

a processor, wherein the processor executes a process of setting a first configuration and a second configuration to a user terminal, the first configuration is a configuration in which the user terminal discontinuously monitors a physical downlink control channel (PDCCH) on which a control signal is transmitted, the control signal being for receiving multicast data transmitted by the SC-PTM from the base station, the first configuration includes an On-duration timer that is a period during which the user terminal receives the PDCCH, the first configuration is a configuration corresponding to a group radio network temporary identifier (RNTI) assigned commonly to a plurality of user terminals that receive identical multicast data by the SC-PTM, and the second configuration is a configuration in which the user terminal discontinuously monitors a physical downlink control channel (PDCCH) on which a control signal is transmitted, the control signal being for receiving data transmitted by a transmission method different from the SC-PTM, from the base station.

3. A user terminal that supports single cell point to multipoint (SC-PTM) comprising:

a receiver configured to receive a signal from a base station; and a controller, wherein the receiver receives a first configuration and a second configuration from the base station, the controller sets the first configuration and the second configuration, the first configuration is a configuration in which the user terminal discontinuously monitors a physical downlink control channel (PDCCH) on which a control signal is transmitted, the control signal being for receiving multicast data transmitted by the SC-PTM from the base station, the first configuration includes an On-duration timer that is a period during which the user terminal receives the PDCCH, the first configuration is a configuration corresponding to a group radio network temporary identifier (RNTI) assigned commonly to a plurality of user terminals that receive identical multicast data by the SC-PTM, and the second configuration is a configuration in which the user terminal discontinuously monitors a physical downlink control channel (PDCCH) on which a control signal is transmitted, the control signal being for receiving data transmitted by a transmission method different from the SC-PTM, from the base station.

* * * * *